US008774330B2

(12) United States Patent
Dubey et al.

(10) Patent No.: US 8,774,330 B2
(45) Date of Patent: Jul. 8, 2014

(54) COARSE TIMING ACQUISITION

(75) Inventors: Amit Ranjan Dubey, Los Angeles, CA (US); Cimarron Mittelsteadt, Santa Clarita, CA (US)

(73) Assignee: ViXS Systems, Inc., Toronto, Ontario (CA)

(*) Notice: Subject to any disclaimer, the term of this patent is extended or adjusted under 35 U.S.C. 154(b) by 25 days.

(21) Appl. No.: 13/324,217

(22) Filed: Dec. 13, 2011

(65) Prior Publication Data

US 2013/0148765 A1    Jun. 13, 2013

(51) Int. Cl.
*H04L 27/06* (2006.01)

(52) U.S. Cl.
USPC ............................ 375/343; 375/340; 375/316

(58) Field of Classification Search
CPC .................................................. H04L 27/2663
USPC .......................................... 375/343, 340, 316
See application file for complete search history.

(56) References Cited

U.S. PATENT DOCUMENTS

| 5,920,598 | A | * | 7/1999 | Hyakudai et al. | ............. | 375/316 |
| 2009/0282301 | A1 | * | 11/2009 | Flynn et al. | ............. | 714/710 |
| 2009/0304128 | A1 | * | 12/2009 | Izumi et al. | ............. | 375/343 |
| 2013/0128807 | A1 | * | 5/2013 | Vermani et al. | ............. | 370/328 |

OTHER PUBLICATIONS

CTE Implication Paper, "The Challenges and Rewards of MoCA Deployment for the Home Network," An Implication paper prepared for the Society of Cable Telecommunications Engineers by Spirent Communications, http://mocalliance.org/marketing/white_papers/Spirent_white_paper.pdf, pp. 1-29, downloaded Aug. 30, 2011.
Litwin, Louis, "Matched filtering and timing recovery in digital receivers," RF time and frequency, Sep. 2001, pp. 32, 36, 40, 42, 44, 46, and 48.
Halford, Steve and Halford, Karen, "OFDM Uncovered Part 2: Design Challenges," http://www.eetimes.com/General/DisplayPrintViewContent?contentItemID=4142294, downloaded Oct. 18, 2011, 4 pages.
Luise, Marco and Reggiannini, Ruggero, "Carrier Frequency Acquisition and Tracking for OFDM Systems," IEEE Transactions on Communications, vol. 44, No. 11, Nov. 1996, pp. 1590-1598.
Mueller, Kurt H. and Müller, Markus, "Timing Recovery in Digital Synchronous Data Receivers," IEEE Transactions on Communications, vol. Com-24, No. 5, May 1976, pp. 516-531.
Ovadia, Shlomo, "Home Networking on Coax for Video and Multimedia," Overview for IEEE 802.1AVB, Multimedia over Coax Alliance, May 30, 2007, pp. 1-15.

* cited by examiner

*Primary Examiner* — Michael Neff
(74) *Attorney, Agent, or Firm* — Abel Law Group, LLP

(57) ABSTRACT

A coarse timing acquisition technique includes generating a sequence detection indicator. The sequence detection indicator indicates detection of a sequence of repeated symbols in a received signal. The sequence detection indicator is based on a first energy threshold and a normalized moving sum of an autocorrelation signal. The autocorrelation signal is based on the received signal.

17 Claims, 7 Drawing Sheets

COARSE TIMING ACQUISITION

BACKGROUND

1. Field of the Invention

The present invention relates to communications systems, and more particularly, to timing in communications systems.

2. Description of the Related Art

In a typical packet-based communications system, data packets include a header or preamble portion and a payload portion. In general, the preamble portion facilitates delivery of the payload, which is the part of the transmitted data that is the purpose of the transmission. Accurate identification of the end of a preamble portion of a data packet and the beginning of a payload portion of the data packet facilitates data recovery that achieves a target performance rate. Accordingly, a robust technique for identifying a payload portion of a received data packet is desired.

SUMMARY OF EMBODIMENTS OF THE INVENTION

In at least one embodiment of the invention, a method includes generating a sequence detection indicator. The sequence detection indicator indicates detection of a sequence of repeated symbols in a received signal. The sequence detection indicator is based on a first energy threshold and a normalized moving sum of an autocorrelation signal. The autocorrelation signal is based on the received signal.

In at least one embodiment of the invention, an apparatus includes a normalization module configured to normalize a moving sum of an autocorrelation signal based on a received signal. The moving sum of an autocorrelation signal is normalized to an energy level of the received signal to thereby generate a normalized moving sum of the autocorrelation signal. The apparatus includes a decision module configured to generate a sequence detection indicator based on a first energy threshold and the normalized moving sum of the autocorrelation signal.

In at least one embodiment of the invention, a receiver includes a storage device configured to store a window of samples of a received signal. The receiver includes a sequence detection module configured to generate a sequence detection indicator indicating detection of a sequence of repeated symbols in the window of samples. The sequence detection indicator is based on a first energy threshold and a normalized moving sum of an autocorrelation signal. The autocorrelation signal is based on the window of samples.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A digital communications system demodulates a payload portion of a received data packet to recover data from a received signal, which is a digital version of a signal received from a transmitting node over a channel. A robust technique for data recovery includes identifying a payload portion of a data packet received by a receiving node in the presence of noise, multipath dispersion, and significant frequency offset, includes a coarse timing acquisition technique that identifies receipt of a packet and identifies approximately which sample of the received signal is the first sample of the payload portion of the packet.

Figure 1:
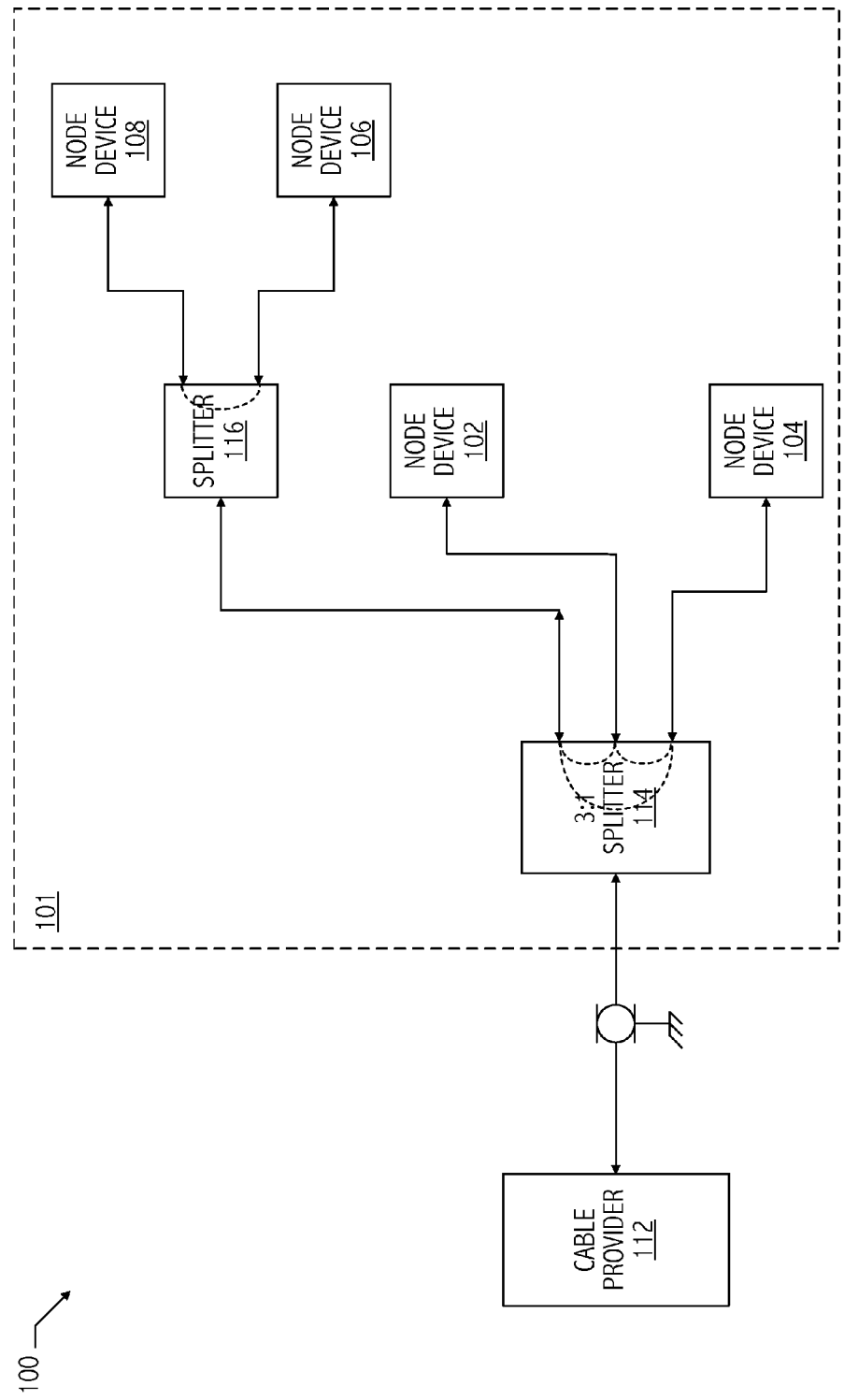
FIG. 1 illustrates a functional block diagram of an exemplary communications network.

Referring to FIG. 1, in an exemplary digital communications network (e.g., network 100) nodes (e.g., nodes 102, 104, 106, and 108) and splitters (e.g., splitters 114 and 116) are configured as a local area network (e.g., network 101) using communications over a channel (e.g., coaxial cables). In at least one embodiment of network 100, nodes 102, 104, 106, and 108 communicate with a wide-area network (e.g., cable provider 112) via splitter 114 and/or splitter 116. In addition, in at least one embodiment of network 100, nodes 102, 104, 106, and 108 communicate with each other via splitter jumping.

Figure 2:
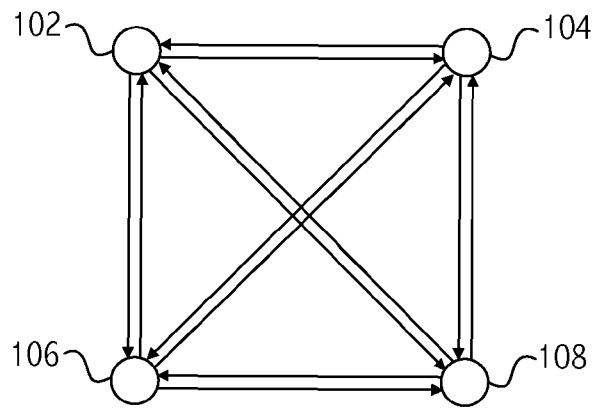
FIG. 2 illustrates an exemplary logical topology of node devices of the communications network of FIG. 1.

Note that due to effects of splitter jumping and reflections at different terminations of network 101, channel characteristics (e.g., attenuation and delay) for a link between two nodes may be different from the channel characteristics for a link between two other nodes. In addition, channel characteristics in a forward path may be different from channel characteristics in a reverse path. Thus, channel capacity between each source node and destination node varies from the channel capacity for two other source nodes and destination nodes. Accordingly, to appropriately use channel capacity of network 101, individual nodes of network 101 determine and store suitable separate physical (PHY) parameters tailored for each link (i.e., store separate PHY profiles for each link). Referring to FIG. 2, a logical model of network 101 is a fully-meshed collection of point-to-point links. Each link has unique channel characteristics and capacity. In addition to point-to-point communications, network 101 supports broadcast and multicast communications in which a source node uses a common set of PHY parameters that may be received by all destination nodes.

In at least one embodiment of network 101, nodes 102, 104, 106, and 108 share a physical channel. Thus, only one node is allowed to transmit at a particular time. For example, the physical channel is time division-multiplexed and coordinated by a Media Access Control (MAC) data communication protocol sublayer using time division multiple access (TDMA). In at least one embodiment, network 101 is a centrally coordinated system with one node being a network-coordinator (NC). A node that is the NC transacts data on the network like any other node, but is also responsible for transmitting beacons to advertise network presence and timing, coordinating a process for admitting nodes to the network, scheduling and coordinating transmission of data among all nodes in the network, scheduling and coordinating link-maintenance operations (e.g., operations during which nodes update their physical profiles), and other functions.

In at least one embodiment of node 102, a cyclic prefix is concatenated with modulated symbols to form an Adaptive Constellation Multi-tone (ACMT) symbol. For example, one ACMT symbol is formed by copying and prepending a number of last samples (i.e., cyclic prefix samples ($N_{CP}$)) of an inverse first Fourier transform (IFFT) output (N samples), resulting in an output symbol having $N+N_{CP}$ samples. Multiple ACMT symbols are concatenated to form a packet. In general, a receiver is configured to discard the cyclic prefix samples. However, the cyclic prefix serves two purposes. First it serves as a guard interval that reduces or eliminates intersymbol interference from a previous symbol. Secondly, the cyclic prefix facilitates modeling linear convolution of a frequency-selective multipath channel as circular convolution, which in turn may be transformed to the frequency domain using a discrete Fourier transform. This approach allows for simple frequency-domain processing, such as for channel estimation, equalization, and demapping and recovery of the transmitted data bits. The length of the cyclic prefix is chosen to be at least equal to the length of the multipath channel.

Figure 3:
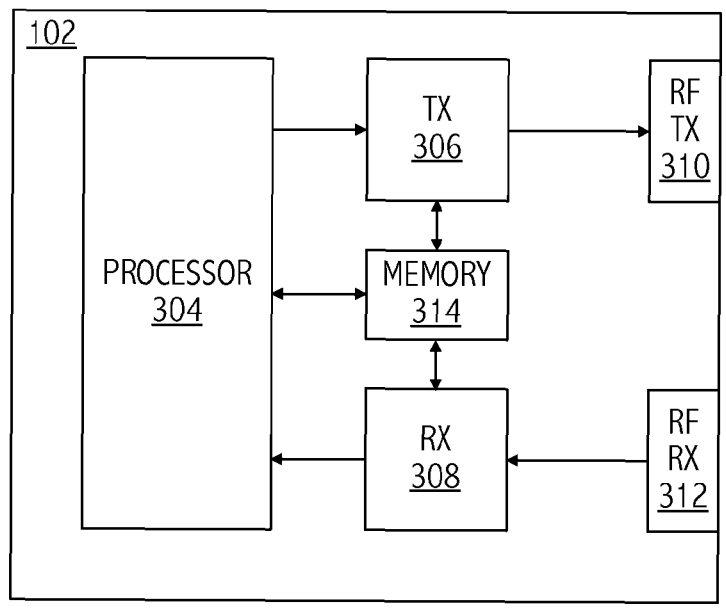
FIG. 3 illustrates a functional block diagram of an exemplary node device of the communications network of FIG. 1.

Referring to FIG. 3, an exemplary node 102 includes a processor configured to generate and process data communicated over network 101. Data to be transmitted over the network is digitally processed in transmitter 306 and transmitted over the channel using RF transmitter 310. In at least one embodiment, node 102 includes a radio frequency receiver configured to receive analog signals over the channel and to provide a baseband analog signal to the receiver path (e.g., receiver 308), which digitally processes the baseband signal to recover data and control information symbols and provide it to processor 304.

In at least one embodiment, node 102 implements orthogonal frequency division multiplexing (OFDM). In general, OFDM is a frequency-division multiplexing scheme utilized as a digital multi-carrier modulation method in which a large number of orthogonal subcarriers having closely-spaced frequencies are used to carry data. The data is divided into several parallel data streams or channels (i.e., frequency bins or bins), one for each subcarrier. Each subcarrier is modulated with a conventional modulation scheme (e.g., quadrature amplitude modulation or phase shift keying) at a low symbol rate, maintaining total data rates similar to conventional single-carrier modulation schemes in the same bandwidth. In at least one embodiment of node 102, the physical interface (e.g., transmitter 306 and receiver 308) utilizes adaptive constellation multi-tone (ACMT), i.e., node 102 pre-equalizes modulation to the frequency response of each link using bit loaded OFDM. In addition, channel profiling techniques tailor the modulation for each link. In at least one embodiment of node 102, physical layer channels are approximately 50 MHz wide (i.e., the ACMT sampling rate is approximately 50 MHz) and the total number of OFDM subcarriers is 256. However, other sampling rates and numbers of subcarriers may be used. In at least one embodiment of node 102, due to DC and channel edge considerations, only 224 of the 256 subcarriers are available for typical communications.

In at least one embodiment of node 102, a modulation profile is generated based on probe packets sent between nodes and analyzed at the receiving nodes. After analysis, a receiving node assigns numbers of bits to subcarriers for a particular link and communicates this information to node 102. An individual ACMT subcarrier may be active or inactive (i.e., turned off). An active ACMT subcarrier is configured to carry one to eight bit Quadrature Amplitude Modulation (QAM) symbols. In at least one embodiment of node 102, the transmit power of a sending node is dynamically adjusted based on modulation profiling using the probe packets and based on link performance.

In general, the channel is time-varying, and link maintenance operations (LMOs) facilitate the recalculation of PHY parameters. Thus, at regular intervals a transmitting node sends one or more probe packets which are received and analyzed by receiving nodes. The receiving nodes send back probe reports to the corresponding transmitting nodes. Those probe reports may include updated parameters. In at least one embodiment of node 102, each probe packet includes a preamble and a payload. In at least one embodiment of node 102, multiple probe types are used for characterization of different network elements. In at least one embodiment of node 102, probe and/or payload packets include a preamble that includes one or more symbols used for channel estimation.

Figure 4:
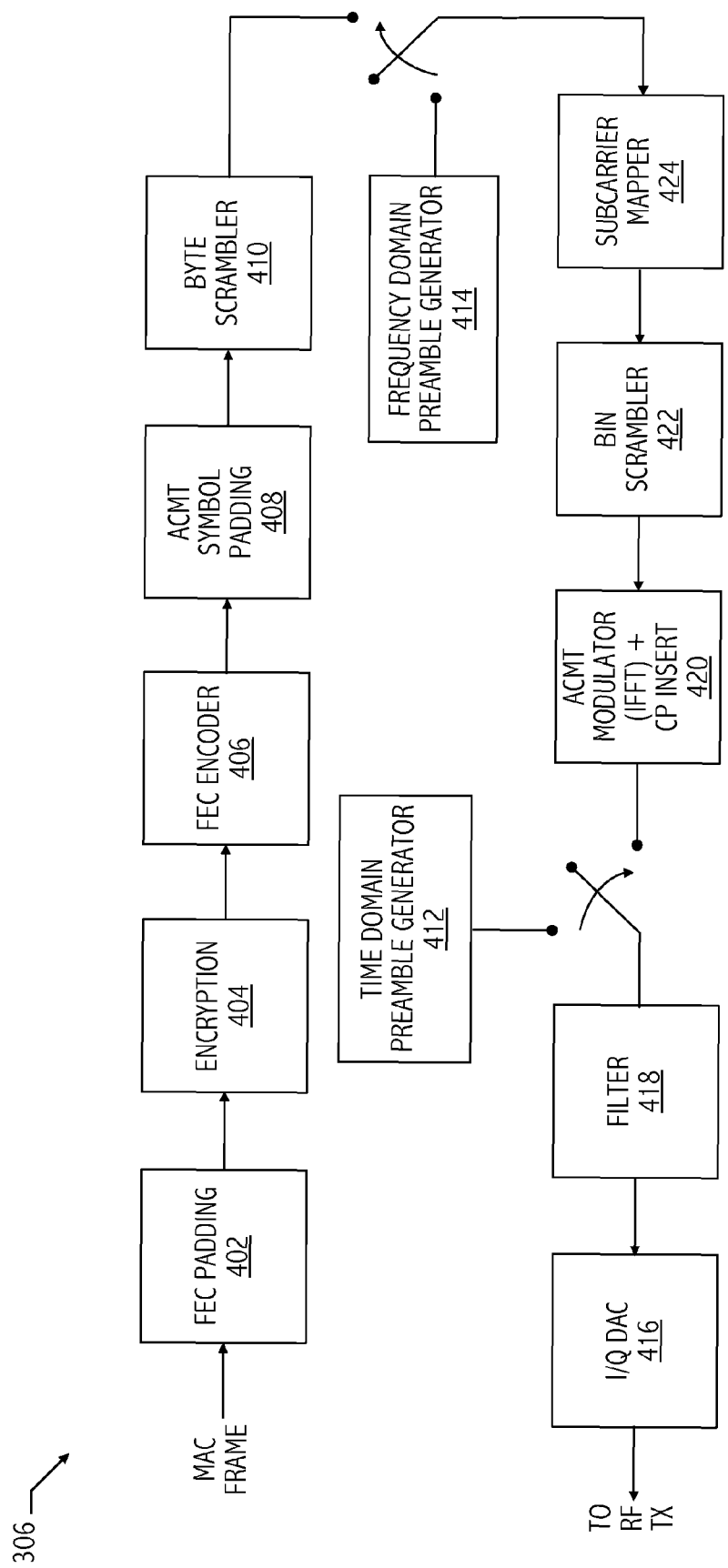
FIG. 4 illustrates a functional block diagram of an exemplary transmitter path of the node device of FIG. 3, consistent with at least one embodiment of the invention.

Referring to FIG. 4, in at least one embodiment, transmitter 306 receives a frame of data from a Medium Access Control data communication protocol sub-layer (i.e., MAC layer). In at least one embodiment of transmitter 306, a channel coding module (e.g., FEC padding module 402) pads bytes so that the FEC encoder receives the required number of bits. In at least one embodiment of transmitter 306, an encryption module (e.g., encryption module 404) encrypts the frame to deter eavesdropping and provide link layer privacy. In at least one embodiment, encryption module 404 implements 56-bit Data Encryption Standard (DES) encryption using a privacy key generated and received from the NC. However, in other embodiments of transmitter 306, other encryption techniques may be used.

In at least one embodiment of transmitter 306, an encoder (e.g., forward error correction (FEC) encoder 406) encodes the frame into using up to two different Reed-Solomon block sizes. All blocks except the last are coded with the maximum Reed-Solomon block size, while the last block may be coded using a shorter block size to reduce the FEC padding. FEC encoder 406 encodes the frame with redundancies using a predetermined algorithm to reduce the number of errors that may occur in the message and/or allow correction of any errors without retransmission. Note that in other embodiments of transmitter 306, other types of forward error correction are used (e.g., other block codes or convolutional codes). In at least one embodiment of transmitter 306, a padding module (e.g., ACMT symbol padding module 408) inserts additional bits into the data to form symbols having a particular ACMT symbol size. In at least one embodiment of transmitter 306, a scrambler module (e.g., byte scrambler 410) scrambles each transmitted data byte to change the properties of the transmitted data stream. For example, byte scrambler 410 facilitates data recovery by reducing dependence of the signal power spectrum on the actual transmitted data and/or reducing or eliminating occurrences of long sequences of '0' or '1' that may otherwise cause saturation of digital circuitry and corrupt data recovery. In at least one embodiment of transmitter 306, an ACMT subcarrier mapping module (e.g., subcarrier mapper 424) maps bits of data to ACMT subcarriers according to a predetermined bit loading profile (e.g., a bit loading profile received from a receiving node and stored in memory). In at least one embodiment of transmitter 306, the predetermined profile is selected from a plurality of predetermined profiles according to a particular mode or packet type (e.g., beacon mode, diversity mode, Media Access Plan (MAP), unicast, or broadcast) and link for transmission (e.g., a profile stored for a particular receiving node).

In at least one embodiment of transmitter 306, a scrambler module (e.g., bin scrambler 422) scrambles the data of the ACMT subcarriers to change the properties of the transmitted data stream (e.g., reduce dependence of the signal power spectrum on the actual transmitted data or to reduce or eliminate occurrences of long sequences of '0' or '1') to properties that facilitate data recovery. A modulator (e.g., ACMT modulator 420) generates the time domain in-phase and quadrature (i.e., I and Q) components corresponding to the OFDM signal. ACMT modulator 420 includes an N-point IFFT and inserts a cyclic prefix to the modulated data (i.e., inserts the cyclic prefix to time domain symbols). For example, ACMT modulator 420 copies the last $N_{CP}$ samples of the IFFT output (e.g., N samples) and prepends those samples to the IFFT output to form an OFDM symbol output (e.g., $N+N_{CP}$ samples). The cyclic prefix is used as a guard interval to reduce or eliminate intersymbol interference from a previous symbol and also to facilitate linear convolution of the channel to be modeled as a circular convolution, which may be transformed to the frequency domain using a discrete Fourier transform. This approach allows for simple frequency-domain processing, such as for channel estimation, equalization, and demapping and recovery of transmitted data. The length of the cyclic prefix is chosen to be at least equal to the length of the multipath channel. In at least one embodiment of transmitter 408, filter 418 limits the frequency band of the signal to a signal having a particular spectral mask prior to digital-to-analog conversion (e.g., by digital-to-analog converter 416) and limits any frequency modulation to a higher frequency band (e.g., from baseband to one of four frequency bands in the range of 850 MHz to 1525 MHz at 25 MHz increments) for transmission.

Depending upon a particular communication type, in at least one embodiment of transmitter 306, frequency domain preamble generator 414 or time domain preamble generator 412 inserts a preamble into the packet prior to processing a MAC frame of data. For example, rather than processing a MAC frame through the portion of the transmitter path including FEC padding module 402, encryption module 404, FEC encoder 406, ACMT symbol padding module 408, and byte scrambler 410, an alternate source (e.g., frequency domain preamble generator 414) provides a plurality of frequency domain preamble symbols, including one or more frequency domain symbols (e.g., which are generated or retrieved from a storage device) to subcarrier mapper 424. Subcarrier mapper 424 maps bits of those frequency domain preamble symbols to individual subcarriers. Those frequency domain preamble symbols are then processed by the remainder of transmitter 306 (e.g., bit scrambled, ACMT modulated, filtered, and converted to an analog signal) and sent to RF TX 310 for transmission. The frequency domain preamble symbols provide a reference signal that may be used by the receiver for timing and frequency offset acquisition, receiver parameter calibration, and PHY payload decode. In at least one embodiment of transmitter 306, frequency domain preamble generator 414 provides a plurality of channel estimation frequency domain symbols (e.g., two channel estimation symbols) to other portions of transmitter 306 (e.g., subcarrier mapper 424, ACMT modulator 420, filter 418, and DAC 416). In at least one embodiment of transmitter 306, time domain preamble generator 412 inserts a plurality of time domain symbols directly to filter 418 for digital-to-analog conversion and then transmission over the link. The time domain preamble symbols provide a reference signal that may be used by the receiver to identify packet type and for symbol timing and frequency offset acquisition.

Figure 5:
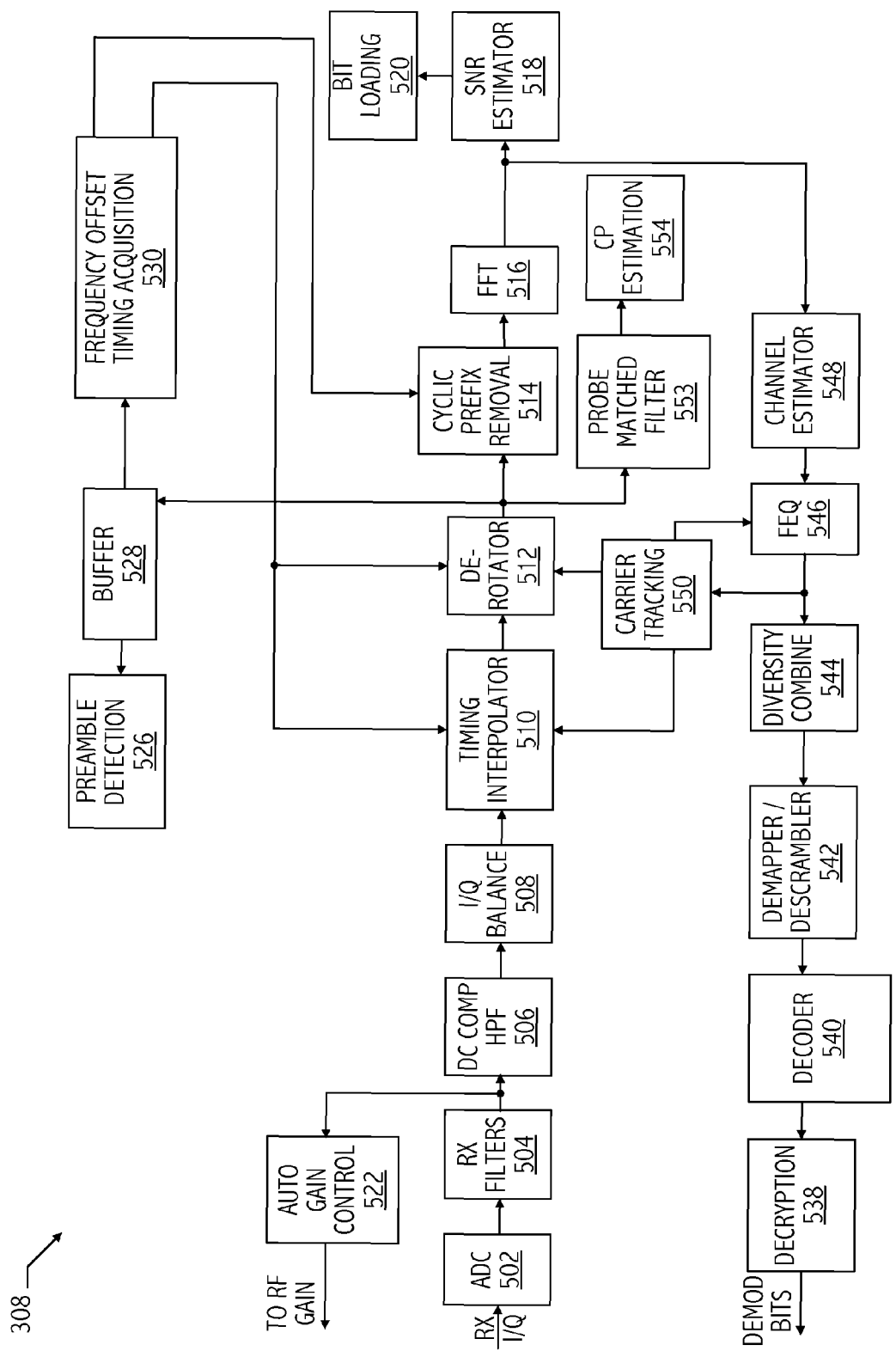
FIG. 5 illustrates a functional block diagram of an exemplary receiver path of the node device of FIG. 3, consistent with at least one embodiment of the invention.
Figure 6:
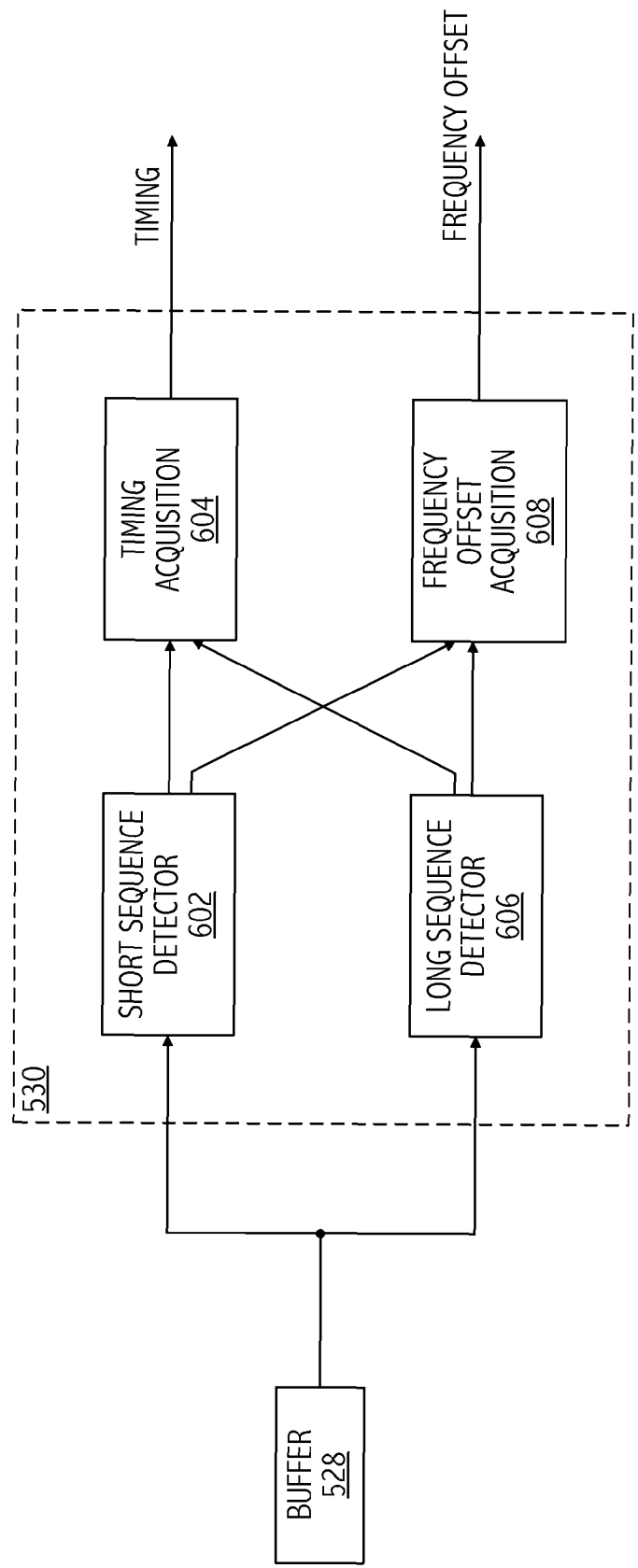
FIG. 6 illustrates a functional block diagram of an exemplary frequency offset and timing acquisition module 530 of FIG. 5, consistent with at least one embodiment of the invention.

Referring to FIG. 5, in at least one embodiment, receiver 308 receives an analog signal from the RF receiver interface (e.g., RF receiver 312 of FIG. 3) and analog-to-digital converter (e.g., ADC 502) converts in-phase and quadrature analog signal components of the received signal into a complex digital signal. Referring back to FIG. 5, in at least one embodiment of receiver 308, one or more filters (e.g., RX filters 504) limit the complex digital signal to a baseband signal having a particular bandwidth. In at least one embodiment of receiver 308, one or more other filters (e.g., high-pass filter 506) attenuates or removes a DC component of the complex digital signal. In at least one embodiment of receiver 308, I/Q balance module 508 adjusts the real and imaginary components of the complex baseband signal, which are balanced at the transmitting node, but become unbalanced after transmission over the channel by analog circuitry and due to any imbalance introduced by RF receiver 312. I/Q balance module 508 adjusts the in-phase and quadrature components of the complex baseband signal to have approximately the same gain and/or phase. In at least one embodiment of receiver 308, a timing module (e.g., timing interpolator module 510) adjusts the sample timing based on a timing offset, e.g., by using a delay filter to interpolate samples and generate an output sample having a particular timing based on the timing offset. In at least one embodiment of receiver 308, a frequency offset correction module (e.g., de-rotator module 512) compensates for any frequency offset e.g., by performing a complex multiply of the received data with a complex data value based on a previously determined target angle of rotation that compensates for the frequency offset. In at least one embodiment of receiver 308, a module (e.g., cyclic prefix removal module 514) strips a number of samples (e.g., $N_{CP}$ samples, where $N_{CP}$ is the number of samples inserted by the transmitter as the cyclic prefix) from the de-rotated data symbol and provides the resulting time domain symbol to a demodulator (e.g., fast Fourier transform (FFT) module 516), which generates frequency domain symbols.

In at least one embodiment of receiver 308, during data demodulation and decode sequences, a frequency domain equalizer (e.g., FEQ 546) reduces effects of a bandlimited channel using frequency domain equalizer taps generated by a channel estimation module (e.g., channel estimator 548), as described further below. In at least one embodiment of receiver 308, during data demodulation and decode sequences that communicate in a diversity mode (e.g., a mode in which the same signal is transmitted by multiple subcarriers) diversity combiner module 544 combines signals repeated on multiple subcarriers into a single improved signal (e.g., using a maximum ratio combining technique). In at least one embodiment of receiver 308, frequency domain symbols are demapped from the subcarriers and descrambled (e.g., using demapper/descrambler module 542) according to a technique consistent with the mapping and scrambling technique used on a transmitting node. The demapped and descrambled bits are decoded (e.g., using decoder 540) consistent with coding used by a transmitting node. A decryption module (decryptor 538) recovers demodulated bits and provides them to a processor for further processing.

In at least one embodiment of receiver 308, carrier tracking module 550 uses a pilot subcarrier ($n_P$) that carries known training data to synchronize the frequency and phase of the receiver clock with the transmitter clock. A typical pilot tone transmitted from the source node has only a real component (i.e., the imaginary component is zero), and the imaginary part of the complex output of subcarrier $n_P$ from the FFT is input to a feedback loop on the receiver. That feedback loop is configured to adjust the receive clock signal to drive to zero the recovered imaginary part of the pilot tone. The imaginary part of the complex output of subcarrier $n_P$ from the FFT is input to a loop filter, which via a digital-to-analog converter delivers a digital control signal to de-rotator 512 and timing interpolator 510. However, in other embodiments of receiver 308, the output of the loop filter is a control voltage that is provided to a VCXO that adjusts the frequency of the receive clock. In at least one embodiment of receiver 308, rather than dedicating one or more subcarriers to being pilot tones that carry known data, a carrierless tracking technique is used to generate an indicator of frequency offset that is used to adjust the frequency of the receive clock.

In at least one embodiment of receiver 308, during timing and frequency acquisition sequences, a gain control module (e.g., automatic gain control module 522) provides power adjustment signals to monotonically adjust analog gain of the RF receiver interface (e.g., RF receiver 312 of FIG. 3) using adjustments in a particular range and step size. Referring back to FIG. 5, in at least one embodiment of receiver 308, during timing and frequency acquisition sequences, the output of de-rotator 512 is stored in a storage device (e.g., buffer 528). The stored data is used to detect a preamble of a packet (e.g., using preamble detection module 526). In at least one embodiment, a frequency offset and timing acquisition module (e.g., frequency offset and timing acquisition module 530) generates an indication of a start of a symbol and an indication of a frequency offset for use by the receiver for recovery of subsequent received symbols (e.g., timing interpolator 510, de-rotator 512, and cyclic prefix removal module 514).

In a typical OFDM system, a transmitter oscillator frequency and subcarrier frequencies are related by integers. A technique for synchronizing subcarriers at the receiver to subcarriers generated at a transmitting node uses at least one frequency offset determination during an acquisition interval (e.g., coarse and fine frequency offset determinations). For example, a coarse frequency offset determination technique may resolve offsets greater than ½ of the subcarrier spacing, and fine frequency offset determinations may resolve offsets up to ½ of the subcarrier spacing. In at least one embodiment of receiver 308, frequency offset and timing acquisition module 530 performs both coarse frequency acquisition and fine frequency acquisition to determine timing offsets and frequency offsets using known sequences received as part of a packet preamble. However, other embodiments of frequency offset and timing acquisition module 530 use one of the coarse and fine frequency offset acquisition techniques, or a frequency offset acquisition technique having only one granularity. The coarse and fine frequency acquisition techniques use known symbols and require channel stationarity for the corresponding time interval. However, once the preamble of a packet is over, slight changes in the overall system may result in additional frequency offset. Accordingly, a carrier tracking module (e.g., carrier tracking module 550) implements a decision-directed, frequency tracking technique to determine frequency offsets for reliable data demodulation that compensates for the time-varying nature of carriers to achieve and maintain a target system performance level (e.g., target bit-error rate).

Referring back to FIG. 5, in at least one embodiment of receiver 308, during receipt of symbols of a probe signal or other signal used to determine physical characteristics of a link, a signal-to-noise ratio (SNR) estimator (e.g., SNR estimator 518) generates an SNR estimate based on multiple frequency domain symbols. A bit loading module (e.g., bit loading module 520) assigns a number of bits for transmission over individual subcarriers of the OFDM channel based on the SNR estimate. For example, bit loading module 520 turns off an individual subcarrier or assigns a one to eight bit QAM symbol to the individual subcarrier. In general, bit loading module 520 generates a bit allocation for each subcarrier of an OFDM signal and receiver 308 communicates those bit loading assignments to a transmitting node for a particular link for generating packets for communication during data communications intervals. In addition, the resulting bit loading is stored in receiver 308 for data recovery during subsequent communications sequences. Note that transmitter 306 and receiver 308 are exemplary only and other transmitters and receivers consistent with teachings herein exclude one or more modules or include one or more additional modules in the transmit and receive paths, respectively.

In general, FEQ 546 reduces effects of a bandlimited channel by equalizing the channel response. In at least one embodiment of receiver 308, a payload packet received over a particular link includes a preamble portion that includes one or more symbols for channel estimation. A typical channel estimation symbol is generated at a transmitting node associated with the particular link using a pseudorandom number generator obtained from a storage device or generated using another suitable technique. In at least one embodiment of receiver 308, channel estimator 548 estimates the channel response based on received channel estimation symbols. Channel estimator 548 determines frequency domain equalizer coefficients for the link based on that estimated channel response (i.e., channel response estimate) and provides the frequency domain equalizer coefficients to FEQ 546 for use during data demodulation and decode sequences.

In at least one embodiment, FEQ 546 is a transversal or tapped-delay-line filter having tap weights determined by channel estimator 548 based on channel conditions associated with the link. A zero-forcing technique for generating the filter tap weights approximates the inverse of the channel with a linear filter to reduce the intersymbol interference to zero in the absence of noise. Such equalization technique is useful when the intersymbol interference is significantly larger than noise. However, at some frequencies, the received signal may be weak and the resulting gain of the zero-forcing filter is very large, which amplifies noise by a large factor and degrades the overall signal-to-noise ratio. In addition, any nulls in the frequency response of the channel cannot be inverted.

In at least one embodiment, channel estimator 548 generates tap weights for FEQ 546 using a minimum mean-square error (MMSE) technique, which, rather than eliminating intersymbol interference, bases the filter taps on a minimum of a total power of noise and intersymbol interference components in an output signal. In at least one embodiment of receiver 308, channel estimator 548 generates a single tap filter having complex coefficients for each subcarrier.

In at least one embodiment of receiver 308, the received signal is generated by a transmitting node using the same source to generate a sampling clock and a carrier signal. Since the carrier signal and the sample clocks are generated by the same source, the timing offset is proportional to the frequency offset. Accordingly, at least one embodiment of frequency offset and timing acquisition module 530 generates frequency offset information (e.g., in frequency offset acquisition module 608) that provides the same frequency offset information to both timing interpolator 510 (e.g., which generates an interpolating polynomial based on the frequency offset information) and de-rotator 512 (e.g., which performs a complex-multiply of the received signal with a sinusoid based on the frequency offset information). In at least one embodiment, frequency offset acquisition module 608 generates that frequency offset information during at least one of two frequency offset determinations. For example, frequency offset acquisition module 608 determines frequency offset information based on a frequency estimate determined during a coarse frequency offset determination. That frequency offset information is used to coarsely adjust timing interpolator 510 and de-rotator 512, which are subsequently adjusted further using frequency offset information generated during a fine frequency offset determination.

The coarse frequency offset determination is based on a first sequence of received symbols and the fine frequency offset determination is based on a second sequence of received symbols received after the first sequence of received symbols and having different properties than the first sequence of received symbols. For example, the first sequence of received symbols is a relatively short sequence of symbols including a 30-sample symbol repeated twelve times. The 30-sample symbol is generated using a pseudo-random number generator. The second sequence of received symbols has a total number of samples greater than or equal to the first sequence (e.g., a sequence of symbols having a total period greater than or equal to the period of the first sequence). For example, the second sequence of received symbols includes eight repetitions of a 64-sample symbol generated using a pseudorandom number generator. Receiver 308 receives the first sequence in a preamble of a payload packet prior to receiving the second sequence in the preamble of the payload packet. In at least one embodiment of frequency offset and timing acquisition module 530, short sequence detector 602 detects the first sequence and long sequence detector 606 detects the second sequence.

In addition to generating frequency offset information, which is used to adjust the frequency of the received signal (e.g., using de-rotator 512) and the phase of the received signal (e.g., using timing interpolator 510) using the first and second received sequences, frequency offset and timing acquisition module 530 generates a packet detection indicator and timing information that is used by receiver 308 to demodulate the payload of the received packet. Since the receiver demodulates the payload data using an FFT, which is performed by processing samples in blocks, the receiver must determine where the block starts, i.e., which samples are included in the first block and subsequent blocks. The timing indicator indicates the first sample of the payload of the received packet. In at least one embodiment of timing acquisition module 530, the timing indicator is an index to the first sample of the payload. In other embodiments, the timing indicator is an index that is a predetermined number of samples offset from the first sample of the received payload. The timing indicator is based on the first and second sequences of symbols received in the preamble of a received packet, which are detected by corresponding detection modules (e.g., short sequence detector 602 and long sequence detector 606, respectively, described further below).

In at least one embodiment of short sequence detector 602, the first sequence is a short sequence of a symbol repeated twelve times, each symbol having thirty samples. However, techniques described herein may be used to detect other received sequences having different numbers of repeated symbols and different numbers of samples per symbol. Typical sequence-detection techniques include using a matched filter to detect a known sequence in the presence of noise. However, when a substantial frequency offset is present (e.g., offsets greater than ½ of the subcarrier spacing) matched filter performance degrades. In addition, a matched filter is computationally intensive. Accordingly, short sequence detector 602 implements a less computationally intensive technique that detects the short sequence in the presence of a frequency offset.

Figure 7:
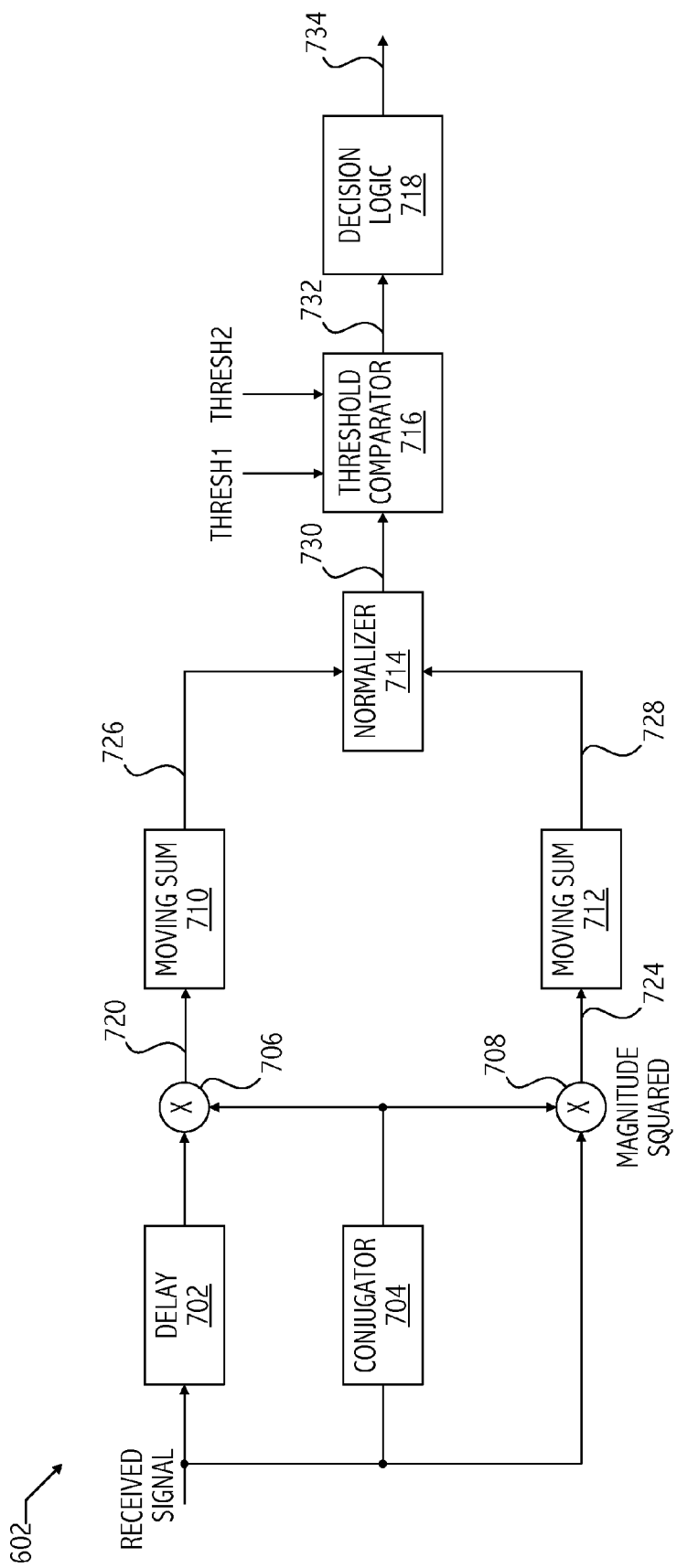
FIG. 7 illustrates a functional block diagram of an exemplary short sequence detection module of FIG. 6, consistent with at least one embodiment of the invention.

FIG. 7 illustrates a technique used by short sequence detector 602. The technique is able to detect a sequence of repeated symbols in the presence of noise and frequency offset. The technique detects the first sequence, and a signal used in coarse timing acquisition in the presence of noise, multipath dispersion (e.g., generated by reflections due to splitters), and substantial frequency offset. The technique includes computing an autocorrelation and energy normalization based on received samples and generating at least one timing indicator based thereon.

In at least one embodiment, short sequence detector 602 detects the sequence of 30-sample symbols repeated twelve times. Short sequence detector 602 receives a received signal including complex-valued samples e.g., from buffer 528 or directly from de-rotator 512 or other module prior to the demodulator (e.g., FFT 516) of receiver 308. A delay module (e.g., delay circuit 702, which includes a shift register or other suitable circuit) delays the samples by a predetermined number of samples (e.g., 30 samples) and provides a delayed sample to a correlation module (e.g., complex multiplier 706). A complex conjugator module (e.g., conjugator 704) generates a complex conjugate of individual samples of the received sequence (e.g., by inverting the sign of the imaginary component of the complex sample value) and provides the complex conjugate to complex multiplier 706 or to a storage element that is accessed by complex multiplier 706. Complex multiplier 706 generates auto-correlation values (e.g., signal 720) corresponding to respective samples of the received sequence for the predetermined time difference (i.e., a time difference corresponding to the number of delayed samples). In addition, complex multiplier 708 receives the samples of the received sequence and the corresponding complex conjugates of those samples and generates a magnitude squared value for each sample (e.g., signal 724) of the received sequence. A summing module (e.g., moving sum module 710) sums a window of correlation values of signal 720. A summing module (e.g., moving sum module 712) sums a window of complex-conjugates of signal 724. In at least one embodiment, the window includes the current sample and a fixed number of prior samples and has the same width as the delay circuit 702 (e.g., 30 samples). However, in other embodiments, the window has a different width.

Figure 8:
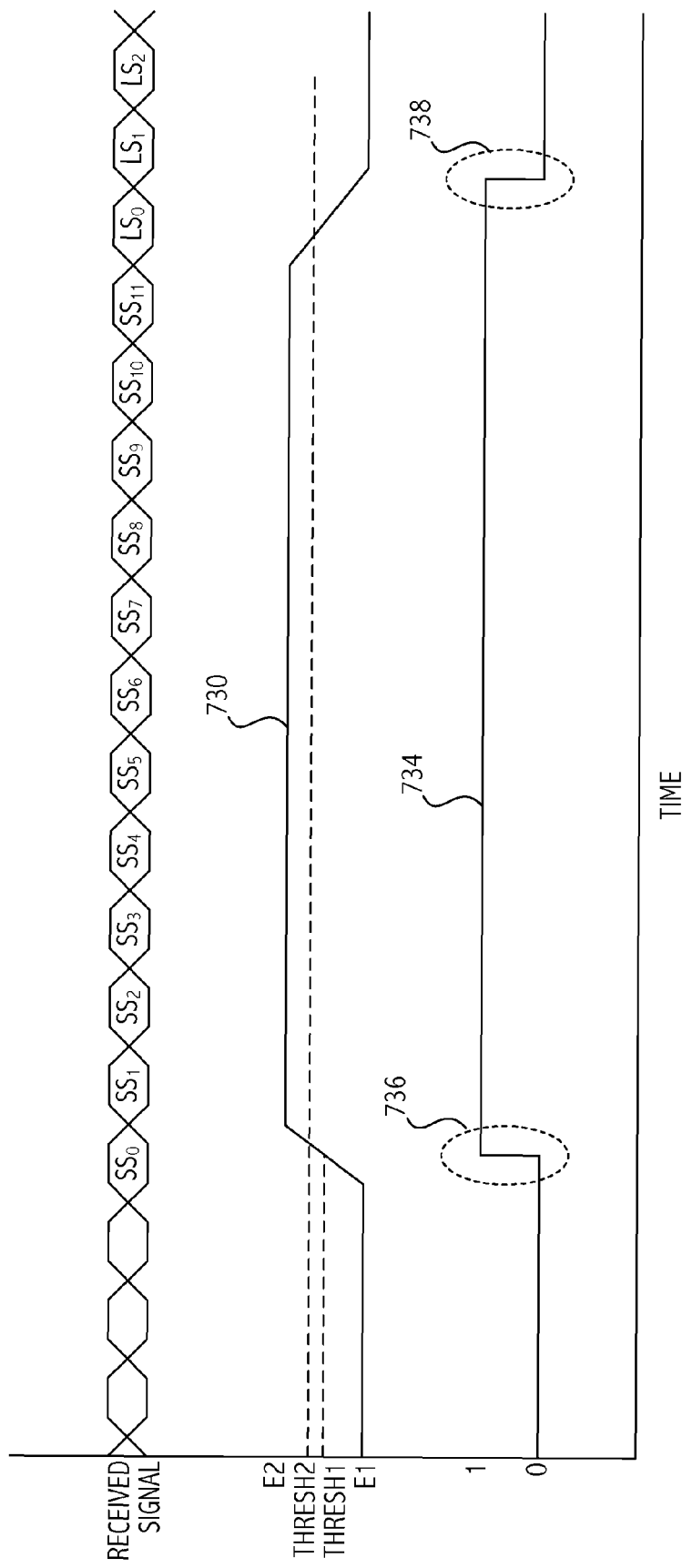
FIG. 8 illustrates timing diagrams for an exemplary short sequence detection module of FIG. 6, consistent with at least one embodiment of the invention.

Referring to FIGS. 7 and 8, a normalization module (e.g., normalizer 714) normalizes the correlation sum values with the magnitude-squared sum values. For example, normalizer 714 generates an energy-normalized correlation signal (e.g., signal 730) that is approximately the quotient of correlation sum values (e.g., signal 726) and corresponding magnitude squared sum values (e.g., signal 728). A comparison module (e.g., threshold comparator 716) compares the energy level of an individual sample of normalized correlation signal 730 to a first predetermined energy threshold level (e.g., THRESH1) and decision logic (e.g., decision logic 718) sets an indicator of packet detection (e.g., signal 732) if the energy of the normalized correlation signal is greater than the first predetermined energy threshold level. In at least one embodiment, in response to the indicator of packet detection being set (e.g., transition 736 of signal 734), threshold comparator 716 compares the normalized correlation signal 730 to a second predetermined energy threshold level (e.g., THRESH2) and detects the end of the training sequence if the normalized correlation signal is less than the second predetermined threshold. In at least one embodiment, decision logic 718 resets the indicator of packet detection in response to the detection of the end of the training sequence. However, in other embodiments, decision logic 718 sets a separate signal indicating the end of the first training sequence. For example, in the absence of repeating symbols, normalized correlation signal 730 has a low magnitude (e.g., E1) and the indicator (e.g., signal 734) has a low value (i.e., '0'). In response to detection of the repeated symbols of the training sequence (e.g., short symbols $SS_0, SS_1, SS_2, \ldots, SS_1$), normalized correlation signal 730 gradually transitions to higher magnitudes and the indicator transitions to a high value (i.e., '1') once normalized correlation signal 730 crosses THRESH1. Normalized correlation signal 730 has the peak magnitude (e.g., E2) for a period approximately equal to the period of the training sequence. The value of normalized correlation signal 730 gradually transitions to the lower magnitude (e.g., E1), which indicates the absence of symbol repetition and the indicator transitions to the low value (e.g., transition 738) once normalized correlation signal 730 crosses below THRESH2.

Note that signal 734 is a coarse approximation of the short sequence. Transition 736 indicates an approximate beginning of the short sequence and thus, an approximate beginning of a packet. Transition 738 indicates an approximate end of the short sequence and indicates that receiver 308 is already receiving the second sequence of symbols (e.g., long symbols $LS_0, LS_1, LS_2, \ldots$), for example, due to the slow decay in the normalized correlation values. The accuracy of the coarse approximation depends on the threshold levels used and how much delay is between the end of the repeated symbols as measured by the correlated samples and the detected end of the repeated symbols. In at least one embodiment of short sequence detector 602, THRESH1 and THRESH2 are programmable thresholds that can be adjusted to improve the short sequence detection and coarse timing estimate (e.g., based on system noise level or other suitable parameters to achieve a target performance level). For example, THRESH1 is adjusted to achieve an acceptable compromise between a probability level of detection and a probability level of false detection. An exemplary value of THRESH1 is associated with a relatively high probability of detection and a relatively low probability level of false detection. The value of THRESH2 is set sufficiently low to result in signal 738 indicating the end of the short sequence only after the short sequence has actually ended (i.e., not before the short sequence has actually ended), but allowing enough long sequence samples for adequate timing acquisition and frequency estimation by timing acquisition module 604 and frequency offset acquisition module 608.

Short sequence detector 602 provides signal 734 to timing acquisition module 604, which determines approximately which sample of the received signal is the first sample of the payload of the packet based on signal 734 and further adjusts this value based on information generated by long sequence detector 606. In addition, short sequence detector 602 provides signal 734 to frequency offset acquisition module 608, which performs a frequency estimate and generates a frequency offset based on the short sequence. That frequency offset is used to adjust the amount of timing interpolation applied by timing interpolator 510 and the amount of rotation applied to a received signal by de-rotator 512. The adjusted timing interpolator 510 and de-rotator 512 are then used to receive the long sequence, which is detected by long sequence detector 606.

In at least one embodiment, long sequence detector 606 includes a matched filter, which correlates an expected second sequence signal with the received signal to detect the second sequence. The output of the matched filter indicates the first sample of the payload. However, other suitable detection techniques may be used. In response to detection of the long sequence, frequency offset acquisition module 608 performs a frequency estimate based on the received long sequence and generates another frequency offset based on that frequency estimate. That frequency offset is used to adjust the amount of timing interpolation applied by timing interpolator 510 and the amount of rotation applied to a received signal by de-rotator 512.

Frequency offset and timing acquisition module 530 provides the timing indicator to cyclic prefix removal module 514, which uses that indicator to identify the beginning of the payload samples. Cyclic prefix removal module 514 strips a predetermined number of cyclic prefix samples (e.g., a number of samples based on the total number of cyclic prefix samples, $N_{CP}$, and a predetermined number of precursor samples) from the payload to isolate the first received OFDM symbol for demodulation using FFT module 516 and further data recovery processing, as described above.

Thus, the techniques described herein facilitate identifying a payload portion of a data packet received by a receiving node in the presence of noise, multipath dispersion, and significant frequency offset. The coarse timing acquisition technique described herein detects receipt of a packet and identifies approximately which sample of the received signal is the first sample of the payload portion of the packet for demodulation and recovery of data of a payload portion of a received data packet allowing the communications system to achieve a target performance rate.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments in which a receiver receives OFDM communications over a link including coaxial cable, one of skill in the art will appreciate that the teachings herein can be utilized with devices consistent with other OFDM communications over links including other wireline or wireless channels. Variations and modifications of the embodiments disclosed herein, may be made based on the description set forth herein, without departing from the scope and spirit of the invention as set forth in the following claims.

What is claimed is:

1. A method comprising:
   generating a sequence detection indicator indicating detection of a sequence of repeated symbols in a received signal, the sequence detection indicator being based on a first energy threshold, a second energy threshold, and a normalized moving sum of an autocorrelation signal, the autocorrelation signal being based on the received signal, wherein generating the sequence detection indicator comprises:
  setting the sequence detection indicator in response to the normalized moving sum of the autocorrelation signal being greater than the first energy threshold; and
  resetting the sequence detection indicator in response to the normalized moving sum of the autocorrelation signal being less than the second energy threshold.

2. The method, as recited in claim 1, further comprising:
  normalizing a moving sum of the autocorrelation signal to the energy of the received signal, the normalization being based on a moving sum of a magnitude squared signal to thereby generate the normalized moving sum of the autocorrelation signal.

3. The method, as recited in claim 2, further comprising:
  summing a moving window of samples of the autocorrelation signal to generate the moving sum of the autocorrelation signal; and
  summing a moving window of samples of the magnitude squared signal to generate the moving sum of the magnitude squared signal.

4. The method, as recited in claim 3, further comprising:
  multiplying a delayed received signal and a complex conjugate signal to generate the autocorrelation signal; and
  multiplying the complex conjugate signal and the received signal to generate the magnitude squared signal.

5. The method, as recited in claim 4, wherein the generating further comprises:
  delaying the received signal by a delay period to generate the delayed received signal; and
  generating the complex conjugate signal based on the received signal.

6. The method, as recited in claim 5, wherein the delay period is based on a number of samples in a symbol period of the sequence.

7. The method, as recited in claim 1, further comprising:
  generating a packet detection indicator based on the sequence detection indicator.

8. The method, as recited in claim 1, further comprising:
  generating a block timing indicator based on the sequence detection indicator, the block timing indicator identifying samples of a block of a payload of the received signal.

9. The method, as recited in claim 8, wherein the block timing indicator indicates receipt of a second sequence of the received signal.

10. An apparatus comprising:
  a normalization module configured to normalize a moving sum of an autocorrelation signal based on a received signal to an energy level of the received signal to thereby generate a normalized moving sum of the autocorrelation signal; and
  a decision module configured to generate a sequence detection indicator, the sequence detection indicator being set in response to the normalized moving sum of the autocorrelation signal being greater than a first threshold, and the sequence detection indicator being reset in response to the normalized moving sum of the autocorrelation signal being less than a second threshold.

11. The apparatus, as recited in claim 10, further comprising:
  a comparison module configured to provide a first indication of a comparison of the normalized moving sum of the autocorrelation signal to the first threshold, the sequence detection indicator being based on the first indicator.

12. The apparatus, as recited in claim 11,
  wherein the comparison module is further configured to provide a second indication of a second comparison of the normalized moving sum of the autocorrelation signal to a second threshold, the sequence detection indicator being based on the second indicator.

13. The apparatus, as recited in claim 12, further comprising:
  at least one moving summer configured to sum a moving window of samples of the autocorrelation signal to generate the moving sum of the autocorrelation signal and further configured to sum a moving window of samples of a magnitude squared signal to generate the energy level of the received signal, respectively.

14. The apparatus, as recited in claim 13, further comprising:
  at least one multiplier configured to multiply a delayed received signal and a complex conjugate signal to generate the autocorrelation signal and further configured to multiply the delayed received signal and a magnitude squared signal to generate the energy level of the received signal.

15. The apparatus, as recited in claim 14, further comprising:
  a delay module configured to delay samples of the received signal by a delay period to generate the delayed received signal, the delay period being based on a number of samples in a symbol period of the sequence.

16. The apparatus, as recited in claim 14, further comprising:
  a complex conjugator configured to generate the complex conjugate signal based on the received signal.

17. The apparatus, as recited in claim 10, further comprising:
  a block timing module configured to generate a block timing indicator based on the sequence detection indicator and a second sequence detection indicator.

\* \* \* \* \*